April 27, 1943.   R. A. KING   2,317,775
REFRIGERATION APPARATUS
Filed Aug. 23, 1941   2 Sheets-Sheet 1
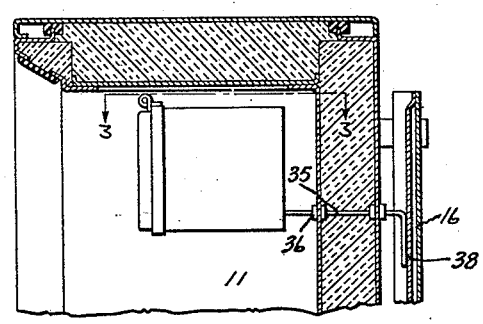
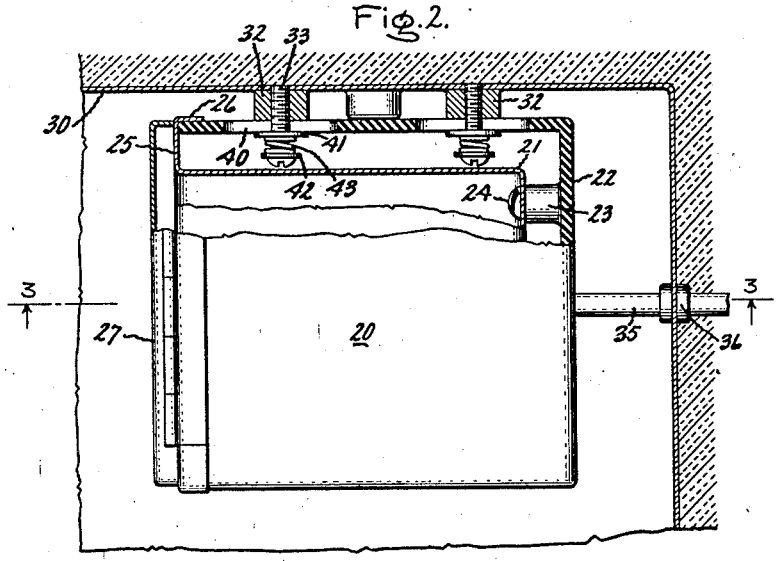
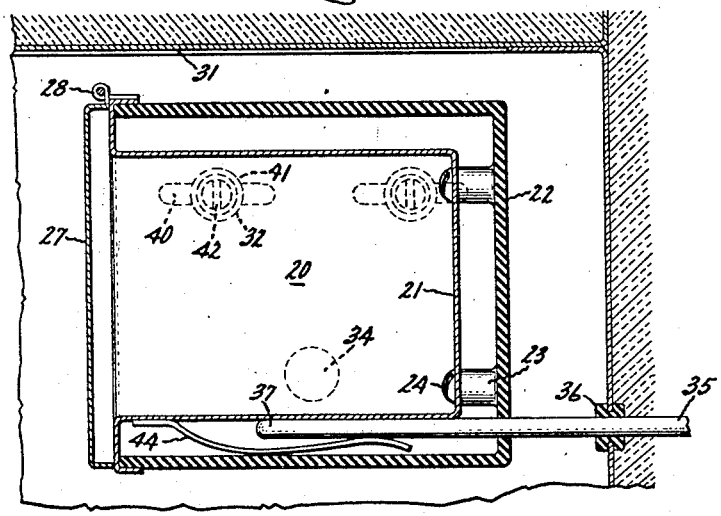
Inventor:
Robert A. King,
by Harry E. Dunham
His Attorney.

Inventor:
Robert A. King,
by Harry E. Dunham
His Attorney.

Patented Apr. 27, 1943

2,317,775

UNITED STATES PATENT OFFICE 2,317,775

REFRIGERATION APPARATUS

Robert A. King, Erie, Pa., assignor to General Electric Company, a corporation of New York Application August 23, 1941, Serial No. 408,007

10 Claims. (Cl. 62—89)

My invention relates to refrigeration apparatus and more particularly to refrigerator cabinets provided with food storage compartments arranged to maintain food, such as butter and the like, at a temperature higher than that within the main food storage space of the cabinet.

In order that food stuffs may be properly preserved in a refrigerator, it is necessary to maintain the food stored within the cabinet at a temperature lower than that at which butter melts easily. When butter or the like is kept in the refrigerator cabinet, it is necessary that it be warmed up before it is in condition for serving at a table, if the butter or the like is to spread easily. Accordingly, it is an object of my invention to provide a new and improved receptacle or compartment constructed and arranged to be disposed within the refrigerated compartment of a refrigerator cabinet and for maintaining the butter or the like kept therein at a temperature which will permit easy spreading thereof.

It is another object of my invention to provide a new and improved receptacle or compartment constructed and arranged in association with a heat transmitting member for conducting heat to the interior of the receptacle.

Another object of my invention is to provide a new and improved receptacle or compartment constructed and arranged in association with a heat transmitting member including a quantity of vaporizable liquid for conducting heat from a source of heat exterior to the cabinet to the interior of the compartment.

Further objects and advantages of my invention will become apparent as the following description proceeds, and the features of novelty which characterize my invention will be pointed out with particularity in the claims annexed to and forming a part of this specification.

Figure 4:
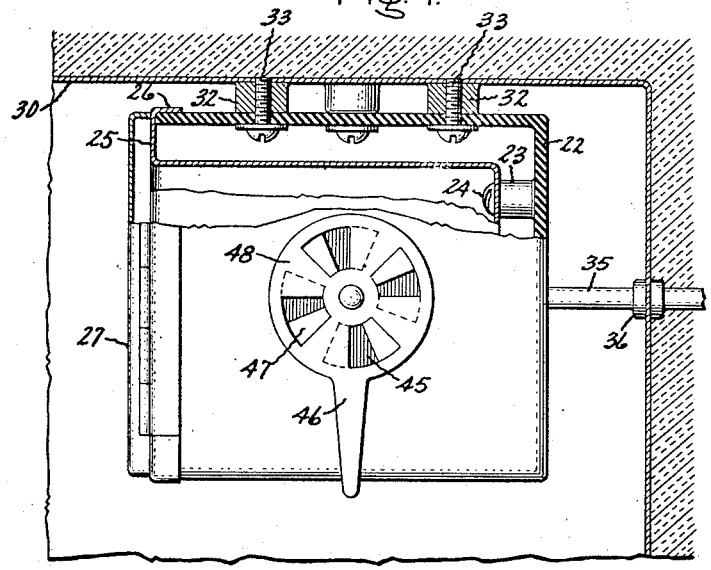
Figure 5:
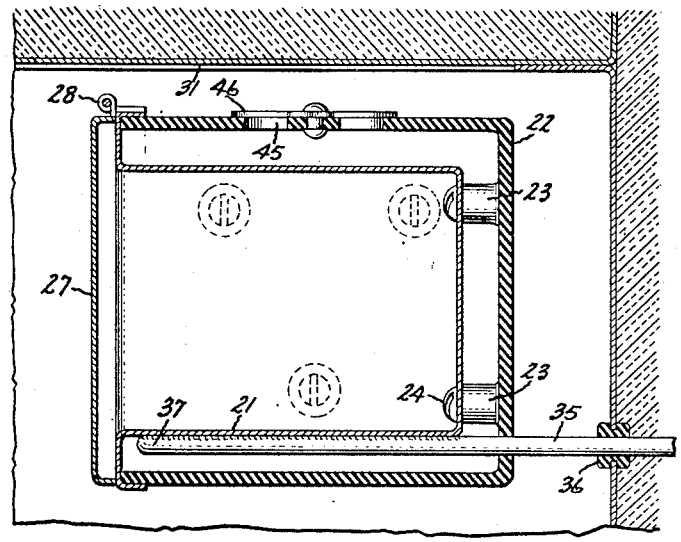

For a better understanding of my invention, reference may be had to the accompanying drawings in which Fig. 1 is a side elevational view in section of a portion of a household type refrigerator provided with a compartment or receptacle embodying the principles of my invention. Fig. 2 is an enlarged view, partly in section, of the receptacle shown in Fig. 1. Fig. 3 is another view of the receptacle shown in Fig. 1 taken along the lines 3—3 of Figs. 1 and 2. Fig. 4 is a view similar to Fig. 2 illustrating a different embodiment of my invention and Fig. 5 is a sectional view of the receptacle shown in Fig. 4.

Referring to the drawings, there is illustrated a refrigerator cabinet 10 of the domestic type having a food storage compartment 11 enclosed by a suitable heat-insulated wall and a suitable heat-insulated door (not shown). In order to cool the food storage compartment, I have provided a suitable cooling unit or refrigerant evaporator, preferably disposed in the upper portion of the compartment 11. Inasmuch as the particular type of refrigerant circulating means plays no part in my present invention, a complete refrigerating system has not been illustrated. A suitable refrigerant circuit is shown in Steenstrup Patent 2,071,183, dated February 16, 1937, assigned to the same assignee as the present invention. Such a system may comprise a motor-compressor unit for withdrawing gaseous refrigerant from the evaporator. Compressed refrigerant is delivered to a condenser 16 of suitable form. Liquid refrigerant is conducted from the condenser to a suitable float chamber. When a predetermined amount of liquid refrigerant is collected in the float valve chamber, a float arranged therein rises and admits refrigerant to the evaporator. The liquid refrigerant is vaporized by the absorption of heat from the chamber 11 and the vapor is withdrawn by the compressor unit. This cycle of operation continues as long as the compressor is operating. The temperature within the compartment 11 may be regulated thermostatically in the usual manner by controlling the operation of the motor which drives the compressor.

In the form of my invention shown in the drawings, the walls of the butter compartment or receptacle 20 comprise inner and outer shells or walls 21 and 22 respectively, the outer shell forming a shield enclosing the inner shell. The inner wall or liner should be formed from a material which is a relatively good conductor of heat, preferably of metal, such as aluminum or copper, for example. The outer wall may be made of metal or any other suitable material as a plastic, for example, but I prefer a relatively non-heat conducting material such as one of the resinous products known by the trade names, "Bakelite," "Textolite," or the like. The walls or shells 21 and 22 are maintained in spaced relationship by any desired means. In the form of my invention shown herein I have illustrated the use of studs 23 secured in any suitable fashion to the outer wall 22 or integral therewith, the inner liner or wall 21 being secured thereto as by means of threaded fastening members 24 extending through suitable openings in the wall or inner liner 21 into threaded engagement with suitably tapped bores in the spacers 23. I have illustrated the front edge of the inner liner 21 as having an outwardly directed flange 25 and a rearwardly directed flange 26 engaging the outer liner or wall 22 and closing the opening between the walls. The access opening at the front of the receptacle may be closed by a suitable door 27 suitably hinged, if desired, to the walls of the compartment as indicated by the numeral 28. The foregoing arrangement provides a receptacle having a layer of relatively dead air disposed between the inner and outer walls which serves to insulate the compartment and minimize the transfer of heat through the walls of the receptacle, the insulating nature of the wall being enhanced by the use of insulating material for the outer casing.

I have provided means for supporting the receptacle 20 from a wall of the cabinet. In the drawings the receptacle is illustrated as being supported on a side wall 30 of the refrigerator cabinet near the top wall 31. It will be understood, however, that the receptacle may be disposed in any desired position within the refrigerator cabinet. The supporting means illustrated herein comprises a plurality of studs 32, the receptacle being supported thereon by means of threaded fastening members 33 extending through suitable openings in the outer wall or casing 22 of the receptacle into threaded engagement with suitably threaded bores in the studs. As best seen in Fig. 2, I have illustrated the use of two such studs 32 disposed near the upper portion of the receptacle 20. In order to maintain the receptacle in suitable vertical alignment with respect to the side wall 30 of the cabinet, I have provided a stud 34 suitably secured to the wall or inner liner of the cabinet and engaging the receptacle near the lower edge thereof.

I have provided means for conducting heat from a suitable source of heat to the interior of the receptacle 20 for maintaining the temperature therein above the normal box air temperature. In the form of my invention illustrated in Figs. 2 and 3, this means takes the form of a heat conducting member 35 extending through the cabinet walls to the receptacle 20. In order to seal the openings in the cabinet walls through which the member 35 extends, I have provided suitable sealing members or gaskets 36. One end of the member 35 is disposed in intimate thermal engagement with the heat conducting wall 21 of the compartment. The other end of the member 35 is disposed in intimate thermal relationship with a source of heat exterior to the cabinet 10 as for example the surface of the refrigerant condenser 16. The heat conducting member illustrated herein is preferably a hermetically sealed chamber, as for example a hollow tube partially filled with a vaporizable liquid such as a refrigerant for example.

In operation, the vaporizable liquid in the lower end 38 of the heat conducting member or container 35 will absorb heat from the condenser and become vaporized. The vapor rises through the tube or chamber to the condenser end 37 of the member where the vaporized material gives up its heat to the wall 21 and is condensed, the liquid flowing back along the tube or chamber into the vaporizing portion 38.

While I have illustrated the vaporizing portion of the heat conducting member 35 as being disposed in thermal engagement with the condenser, my invention is not limited thereto. It will be apparent to those skilled in the art that the heat conducting means will accomplish the aims of my invention if it is associated with both the compartment or receptacle 20 and the refrigerant circulating system, especially a portion of the system which normally operates at a temperature above the vaporizing temperature of the vaporizable liquid. In a conventional refrigerating system it is necessary to obtain such heat exchange from the high pressure "side" or portion of the refrigerant circulating system. Furthermore, wherever the refrigerator cabinet will be disposed in relatively warm ambient air, the vaporizable liquid may be subjected to the heat of the ambient air. It is to be noted that this amount of heating which may be effected by the tube 35 is also dependent on the amount of liquid charge sealed into the tube. In some cases it is possible to substitute some other source of heat for causing vaporization of the heat conducting material or even to dispense with the vaporizable liquid and utilize a heat conductive member to conduct heat from a suitable source.

I have provided means for varying the temperature within the receptacle 20. In the form of my invention shown in Figs. 2 and 3, I have provided a receptacle which is movable with respect to the heat conducting member. To this end I have formed the openings through which the fastening members 33 extend in the form of horizontally extending slots 40 thereby permitting horizontal movement of the receptacle 20 according to the wishes of the user of the refrigerator. In order to maintain the receptacle in relatively secure position, I have provided washers 41 and 42 between the head of the threaded fastening member 33 and the side wall 22, a spring 43 being provided for urging the washer 41 into engagement with the wall 22.

I have provided means for movably maintaining the condensing end 37 of the heat exchange member 35 in intimate thermal engagement with a wall of the compartment 20. This means may comprise a relatively long suitably formed spring 44 urging the heat exchange member into engagement with the wall. Inspection of Fig. 3 will show that if it is desired to apply more heat to the receptacle, the receptacle will be moved rearwardly thereby providing a greater area of engagement between the wall 21 and the portion 37 of the heat conducting member. If, on the other hand, the amount of heat exchange is desired to be decreased, the receptacle may be moved forwardly, in order to decrease the cooperating areas of the wall 21 and the heat conducting member 35.

In the form of my invention shown in Figs. 4 and 5, I have illustrated an arrangement in which the receptacle is fixed with respect to the food storage compartment and the heat conducting member 35. With this arrangement, the intimate thermal relationship between the wall 21 of the receptacle and the condensing portion 37 of the heat conducting member may be improved by securing the two members together as by brazing or soldering or the like. In this form of my invention, the temperature control means takes the form of a plurality of openings 45 in the outer wall 22 of the receptacle 20 for admitting relatively cool circulating box air into thermal engagement with the inner liner 21 of the receptacle in order to remove heat therefrom. In order to control the amount of air circulating in heat exchange relationship with the inner liner, I have provided an adjustable closure member or damper means 46 for varying the size of the openings 45, openings 47 in the damper registering with openings 45 in one position of the control member or damper and intermediate portions 48 closing the openings in another position as will be readily understood.

Although I have shown particular embodiments of my invention, I desire it to be understood that my invention is not limited to the construction set forth, and I intend therefore in the appended claims to cover all modifications which do not depart from the spirit and scope of my invention.

What I claim as new and desire to secure by Letters Patent of the United States, is:

1. In a refrigerator cabinet having a refrigerated compartment and a food storage receptacle within said compartment, means including a hermetically sealed container partially filled with a vaporizable liquid for transferring heat from a suitable source thereof to the interior of said receptacle.

2. In a refrigerator cabinet having a food storage compartment, a refrigerant circulating system for providing refrigeration in said compartment, and a food storage receptacle within said refrigerated compartment, means including a hermetically sealed container partially filled with a vaporizable liquid for transferring heat from a portion of said system to the interior of said receptacle.

3. In a refrigerator cabinet having a food storage compartment, a refrigerant circulating system for providing refrigeration in said compartment, and a food storage receptacle within said refrigerated compartment, a heat conducting member for conducting heat from a portion of said refrigerant circulating system to the interior of said receptacle, and means for selectively and adjustably providing for the circulation of relatively cool box air into heat exchange relationship with said receptacle.

4. In a refrigerator cabinet having a refrigerated compartment, a refrigerant circulating system for refrigerating said compartment and a food storage receptacle in said refrigerated compartment, means associated with said receptacle and said refrigerant circulating system for conducting heat from a portion of said system to said receptacle, shielding means substantially enclosing said receptacle for normally maintaining cool box air out of thermal association with said receptacle, and means associated with said shield for admitting said air into thermal association with said receptacle.

5. In a refrigerator cabinet having a refrigerated compartment, a refrigerant circulating system for refrigerating said compartment and a food storage receptacle in said refrigerated compartment, means associated with said receptacle and said refrigerant circulating system for conducting heat from a portion of said system to said receptacle, shielding means substantially enclosing said receptacle for normally keeping cool box air out of thermal association with said receptacle, said shield having an opening therein, and closure means for said opening, said closure means being adjustable for controlling the amount of relatively cool box air passing through said opening into heat exchange relationship with said receptacle.

6. In a refrigerator cabinet having a refrigerated compartment, a refrigerant circulating system for providing refrigeration therein, a thermally insulated receptacle within said refrigerated compartment and comprising spaced-apart walls, the inner wall thereof being formed from material having relatively good heat conducting characteristics, and means associated with said inner wall and the refrigerant circulating system for conducting heat from a portion of said system to said inner wall.

7. In a refrigerator cabinet having a refrigerated compartment and a refrigerant circulating system for refrigerating said compartment, a thermally insulated compartment in said refrigerated compartment and comprising spaced-apart walls, the inner wall being formed of a relatively good heat conducting material, means associated with said inner wall and said refrigerant circulating system for conducting heat from a portion of said system to said inner wall, the outer wall being formed from a material having relatively good heat insulating qualities.

8. In a refrigerator cabinet having a refrigerated compartment and a refrigerant circulating system for refrigerating said compartment, a thermally insulated receptacle in said refrigerated compartment and comprising spaced-apart walls, the inner wall being formed of a relatively good heat conducting material, means associated with said inner wall and said refrigerant circulating system for conducting heat from a portion of said system to said inner wall, the outer wall being formed from a material having relatively good heat insulating qualities, said outer wall having an opening, and means for adjusting the amount of relatively cool box air passing through said opening into heat exchange relationship with said inner wall for conducting heat away therefrom.

9. In a refrigerator cabinet having a food storage compartment and a refrigerant circulating system for refrigerating said compartment, a food storage receptacle within said refrigerated compartment comprising a heat conductive wall, means associated with said receptacle and said refrigerant circulating system for conducting heat from a portion of said system to said heat conductive wall, said receptacle and said heat conducting means being arranged and constructed for relative movement therebetween for varying the thermal relation therebetween in order to change the relative effect of said heat conducting means on said receptacle.

10. In a refrigerator cabinet having a food storage compartment and a refrigerant circulating system for refrigerating said compartment, a food storage receptacle within said refrigerated compartment comprising a heat conductive wall, means associated with said receptacle and said refrigerant circulating system for conducting heat from a portion of said system to said heat conductive wall, said receptacle and said heat conducting means being arranged and constructed for relative movement therebetween for varying the thermal relation therebetween in order to change the relative effect of said heat conducting means on said compartment, and means for holding said heat conducting means in intimate thermal association with said compartment.

ROBERT A. KING.

DISCLAIMER 2,317,775.—*Robert A. King*, Erie, Pa. REFRIGERATION APPARATUS. Patent dated Apr. 27, 1943. Disclaimer filed Jan. 9, 1946, by the assignee, *General Electric Company*.

Hereby enters this disclaimer to claims 1 and 2 of said patent.

[*Official Gazette February 12, 1946.*]